United States Patent
Hwang et al.

(10) Patent No.: US 11,144,289 B1
(45) Date of Patent: Oct. 12, 2021

(54) DYNAMIC AUTOMATION OF SELECTION OF PIPELINE ARTIFACTS

(71) Applicant: International Business Machines Corporation, Armonk, NY (US)

(72) Inventors: Jinho Hwang, Ossining, NY (US); Muhammed Fatih Bulut, Ossining, NY (US); Ali Kanso, Stamford, CT (US); Shripad Nadgowda, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/877,599

(22) Filed: May 19, 2020

(51) Int. Cl.
*G06F 8/41* (2018.01)
*G06N 20/00* (2019.01)
*G06F 8/71* (2018.01)
*G06F 8/72* (2018.01)

(52) U.S. Cl.
CPC ............. *G06F 8/443* (2013.01); *G06F 8/71* (2013.01); *G06F 8/72* (2013.01); *G06N 20/00* (2019.01)

(58) Field of Classification Search
CPC .. G06F 8/443; G06F 8/71; G06F 8/72; G06N 20/00
See application file for complete search history.

(56) References Cited

U.S. PATENT DOCUMENTS

| | | | |
|---|---|---|---|
| 8,677,318 B2 | 3/2014 | Mohindra et al. | |
| 9,612,821 B2 | 4/2017 | Iyer et al. | |
| 9,740,478 B2 | 8/2017 | Doganata et al. | |
| 10,635,566 B1* | 4/2020 | Talluri | G06F 11/3404 |
| 2013/0174122 A1* | 7/2013 | Watters | G06F 8/36 |
| | | | 717/121 |
| 2013/0174124 A1* | 7/2013 | Watters | G06F 8/71 |
| | | | 717/122 |

(Continued)

FOREIGN PATENT DOCUMENTS

| CN | 105631602 | 6/2016 |
|---|---|---|
| CN | 105976421 A | 9/2016 |

(Continued)

OTHER PUBLICATIONS

Brunnert et al., "Performance-oriented DevOps: A Research Agenda SPEC RG DevOps Performance Working Group" (Year: 2015).*

(Continued)

*Primary Examiner* — Phillip H Nguyen
(74) *Attorney, Agent, or Firm* — Lieberman & Brandsdorfer, LLC

(57) ABSTRACT

An artificial intelligence (AI) platform to support a continuous integration and deployment (CI/CD) pipeline for software development and operations (DevOps). One or more dependency graphs are generated based on application artifacts. A machine learning (ML) model is leveraged to capture a relationship between components in the dependency graph(s) and one or more pipeline artifacts. Responsive a change of an application artifact, the captured relationship is leveraged to identify an impact of the detected change on the pipeline artifact(s). The CI/CD pipeline is selectively optimized and executed based on the identified impact to improve the efficiency of the pipeline and the deployment time.

20 Claims, 7 Drawing Sheets

(56) References Cited

U.S. PATENT DOCUMENTS

| | | | | |
|---|---|---|---|---|
| 2015/0220426 A1* | 8/2015 | Spektor | ............... | G06F 8/71 |
| | | | | 717/131 |
| 2016/0034270 A1* | 2/2016 | Swierc | ............... | G06F 11/3668 |
| | | | | 717/126 |
| 2017/0123963 A1* | 5/2017 | Koren | ............... | G06F 11/3668 |
| 2017/0371636 A1 | 12/2017 | Palavalli et al. | | |
| 2018/0032322 A1 | 2/2018 | Jagannath et al. | | |
| 2018/0088929 A1* | 3/2018 | Eberlein | ............... | G06F 8/65 |
| 2018/0130024 A1 | 5/2018 | Fang | | |
| 2018/0364985 A1 | 12/2018 | Liu | | |
| 2020/0125636 A1 | 4/2020 | Castelli | | |

FOREIGN PATENT DOCUMENTS

| | | |
|---|---|---|
| CN | 106997297 | 8/2017 |
| CN | 109583839 | 4/2019 |
| WO | 2017112801 | 6/2017 |

OTHER PUBLICATIONS

Karamitsos et al., "Applying DevOps Practices of Continuous Automation for Machine Learning" (Year: 2020).*

Nogueira et al., "Improving La Redoute's CI/CD pipeline and DevOps processes by applying Machine Learning techniques" (Year: 2018).*

Dang, Yingnong, et al., "AIOps: Real-World Challenges and Research Innovations," Proceedings of the 41st International Conference on Software Engineering: Companion Proceedings (ICSE '19), 2019, IEEE Press, Piscataway, NJ, USA, 4-5.

Kumar, Rahul, et al., "Building Sankie: An AI Platform for DevOps," Proceedings of the 1st International Workshop on Bots in Software Engineering (BotSE '19), 2019, IEEE Press, Piscataway, NJ, USA, 48-53.

PCT/CN2021/094329 International Search Report and Written Opinion, dated Aug. 16, 2021.

* cited by examiner

DYNAMIC AUTOMATION OF SELECTION OF PIPELINE ARTIFACTS

BACKGROUND

The present embodiments relate to a continuous integration/continuous delivery (CI/CD) pipeline for software Development and Operations (DevOps). More specifically, the embodiments relate to automatically and selectively optimizing CI/CD pipeline artifacts based on identified changes by learning dependencies between application components and CI/CD pipeline components.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, A is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of A and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly, particularly in the environment of a pipeline for delivering software. Existing solutions for efficiently identifying objects and processing content, as well as changes to the structures, are extremely difficult at a practical level.

SUMMARY

The embodiments include a system, computer program product, and method for automatically and selectively optimizing a CI/CD pipeline by learning dependencies between application artifacts and pipeline artifacts.

In one aspect, a computer system is provided with a processing unit operatively coupled to memory, and an artificial intelligence (AI) platform operatively coupled to the processing unit. The AI platform supports a continuous integration and deployment (CI/CD) pipeline for software development and operations (DevOps). The AI platform includes tools in the form of a graph manager, a machine learning (ML) manager, and a monitor. The graph manager functions to generate one or more dependency graphs based on two or more application artifacts. The ML manager, which is operatively coupled to the graph manager, leverages a ML model to capture a relationship between the dependency graph(s) and one or more pipeline artifacts. The monitor, shown herein operatively coupled to the ML manager, functions to detect a change to the application artifact(s), and responsive to the detected change, the ML manager leverages the captured relationship to identify an impact of the detected change on the pipeline artifact(s), and selectively optimize the pipeline in response to the identified impact. The optimization is an automatic encoding of the mapped changes corresponding to the identified impact into the pipeline. The processing unit executes the optimized pipeline.

In another aspect, a computer program product is provided to support a continuous integration and continuous deployment (CI/CD) pipeline software development and operations (DevOps). The computer program product includes a computer readable storage medium having program code embodied therewith. Program code, which is executable by a processor, is provided to generate one or more dependency graphs based on two or more application artifacts. The program code leverages a machine learning (ML) model to capture a relationship between the dependency graph(s) and one or more pipeline artifacts. The program code detects a change to the application artifact(s), and responsive to the detected change, the program code leverages the captured relationship to identify an impact of the detected change on the pipeline artifact(s), and selectively optimize the pipeline in response to the identified impact. The optimization includes automatically encoding mapped changes corresponding to the identified impact into the pipeline. The optimized pipeline is then subject to execution.

In yet another aspect, a method is provided to support continuous integration and deployment (CI/CD) pipeline for software development and operations (DevOps). The method includes generating one or more dependency graphs based on two or more application artifacts. A machine learning (ML) model is leveraged to capture a relationship between the dependency graph(s) and one or more pipeline artifacts. The pipeline is selectively optimized in response to the identified impact, including automatically encoding mapped changes corresponding to the identified impact into the pipeline, and the optimized CI/CD pipeline is executed.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
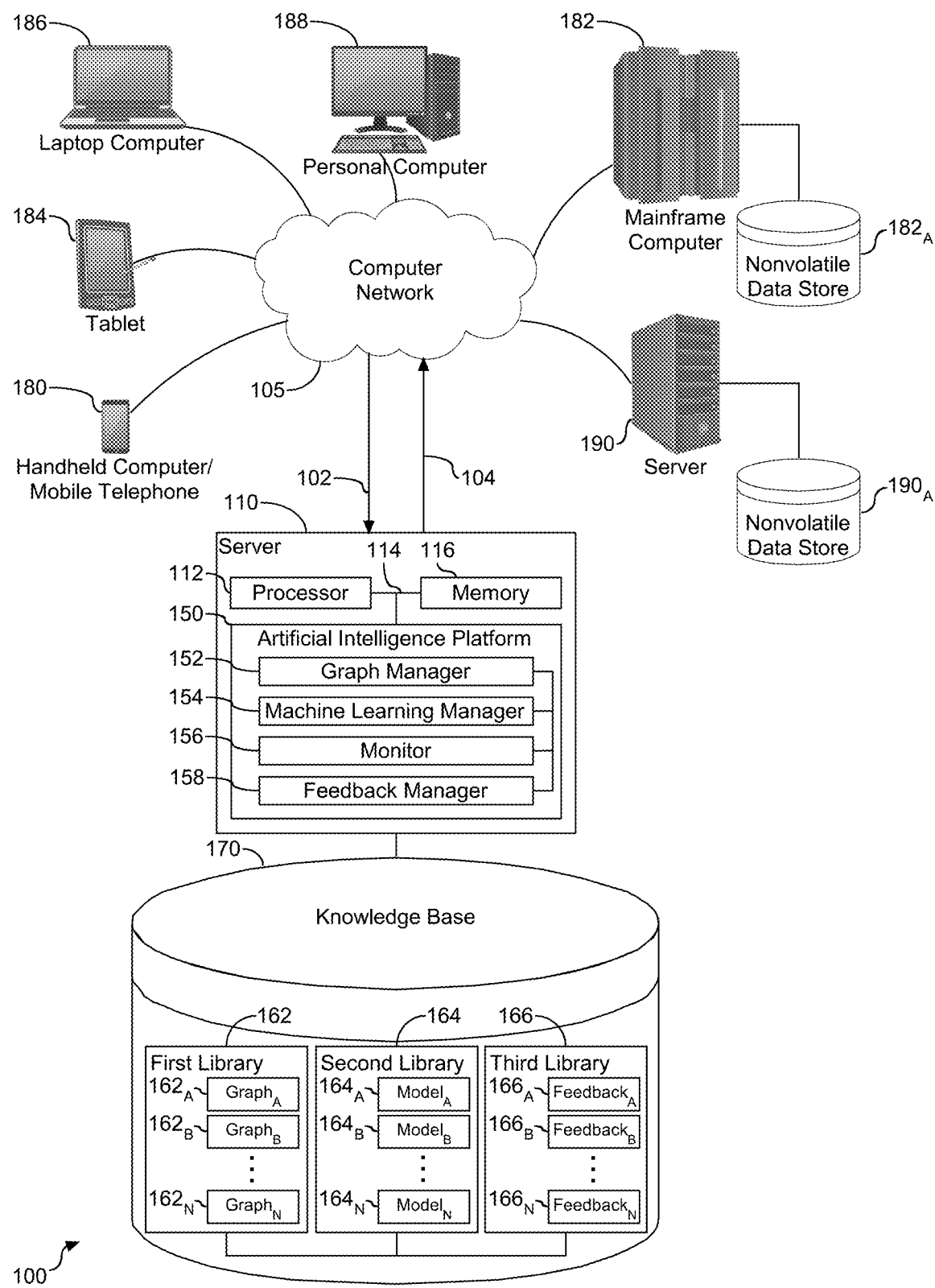
FIG. 1 depicts a schematic diagram of a computer system to support and enable automatic selection and optimization of the CI/CD pipeline.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

DevOps (a portmanteau of "development" and "operations") is a software development method that stresses communication, collaboration, integration, automation and measurement of cooperation between software developers and other information-technology (IT) professionals. DevOps acknowledges interdependence of software development, quality assurance, and IT operations, and aims to help an organization rapidly produce software products and services and to improve reliability and security while providing faster development and deployment cycles. Continuous integration (CI) is a software development process where developers integrate their code in order to identify integration issues. More specifically, CI functions to reduce code development effort, resulting in higher quality software and predictable delivery schedules. Accordingly, continuous integration is the DevOps practice where developed software code is integrated with existing software code. Continuous delivery (CD) automates delivery of application to selected infrastructure environments. It ensures automated pushing of code changes to different environments, such as development, testing, and production. In DevOps, CI serves as a prerequisite for the testing deploy, and release stages of CD.

A continuous integration/continuous delivery (CI/CD) pipeline, hereinafter referred to as a pipeline, is an automated set of processes utilized as part of or integrated into DevOps. The pipeline is composed of several stages. In one embodiment, the stages may include Build, Unit Test, Deploy Development, Integration Tests, Compliance Checks, and Deploy Product. Each of the stages is comprised of one or more actions or options. For example, the Test stage may employ a simple tester, an advanced tester, and/or a compliance scanner. In one embodiment, one or more stages of the pipeline may only require a selection of less than all of the available actions, to avoid redundancy and inefficiency. The pipeline automates the building, testing, and deployment stages.

Micro-services or a micro-service architecture refers to a computer environment in which an application is built as a suite of modular components or services based on function definitions, each corresponding to one function definition, and each running in its own process and communicating by a way of lightweight mechanisms. In the micro-service architecture, data is stored outside of the service, and as such the service is stateless. The services or components are commonly referred to as "atomic services." Each atomic service is a lightweight component for independently performing a modular service. For example, an atomic service might receive and combine keywords, process an algorithm, or make a decision based on the result of algorithm processing. Each module supports a specific task and uses a define interface, such as an application programming interface (API) to communicate with other services. The micro-service architecture supports and enables scalability in hybrid network.

The number of micro-services used in a pipeline is exponentially increasing since micro-services provide more benefits when divided in a cloud native environment. Micro-services have several advantages regarding development and deployment, but they also come with their own challenges. Management of micro-service repositories and pipelines becomes much harder as the number of applications grows. Pipelines are leveraged to automate the deployment of micro-services. As some companies run hundreds or even thousands of micro-services to run their services, the pipelines have become robust over time, and will continue to grow even larger. Every time there is any change in the code, configuration, variable changes, network port changes, etc., the micro-services need to be re-deployed. The re-deployment follows the same process to provision the micro-services and the process is getting more complex and slower due to too many processes. As shown and described herein, an optimized solution is provided to support and enable the pipeline to efficiently expedite the re-deployment process while maintaining a level of reliability.

An application artifact is known in the art as a tangible by-product produced during development of software. The artifact functions as a resource to share files between stages in the pipeline or between different pipelines. Examples of an application artifact include, but are not limited to, application source code, testing code, application programming interface (API) specifications, application configurations, deployment scripts, and variables.

A pipeline artifact is a by-product produced during the software development process. It may consist of project source code, dependencies, and binaries or resources. Examples of the pipeline artifact include, but are not limited to, capabilities, processes, and components that are currently available in the pipeline.

Referring to FIG. 1, a schematic diagram of a computer system (100) is provided with tools to support automatic selection and optimization of the pipeline. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support selection of pipeline artifacts based on application artifacts. More specifically, the AI platform (150) is configured with one or more tools to capture and learn dependencies between application artifacts and pipeline artifacts, and to selectively optimize the pipeline based on the learned dependencies. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input across the network (105) and leverage a knowledge base (170), also referred to herein as a corpus or data source, to apply automatic selection and encoding of one or more pipeline artifacts into the pipeline, also known as the CI/CD pipeline. As shown, the knowledge base (170) is configured with one or more libraries, shown herein as a first library (162), a second library (164), and a third library (166). The quantity of libraries shown herein are for illustrative purposes, and in an embodiment, the knowledge base (170) may have a smaller quantity of libraries. For example, in an embodiment, the knowledge base (170) may have one library or a data structure for the dependency graphs, models, and corresponding feedback.

The first library (162) is shown with a plurality of dependency graphs, referred to herein as graphs, including $graph_A$ ($162_A$), $graph_B$ ($162_B$), and $graph_N$ ($162_N$). The quantity of dependency graphs ($162_A$), ($162_B$), and ($162_N$) is for illustrative purposes and should not be considered limiting. Each dependency graph depicts relationships between portions of an application, and more specifically the graph articulates how each portion of an application change can have an impact on one or more other portions of the application or a related application. The dependency graph(s) indicate code dependencies, configuration dependencies, API dependencies, deployment dependencies, etc., between application artifacts. For example, in an embodiment the graph may articulate how a change detected to one application could require an API test of another application.

The second library (164) is shown with a plurality ML models, including $model_A$ ($164_A$), $model_B$ ($164_B$), and $model_N$ ($164_N$). The quantity of ML models ($164_A$), ($164_B$), and ($164_N$) is for illustrative purposes and should not be considered limiting. Each ML model captures a relationship between a dependency graph stored in the first library (162) and a pipeline artifact. The ML manager (154) employs or applies association rule learning to the ML models ($164_A$), ($164_B$), and ($164_N$) to identify the impact of the captured relationships.

The third library (166) is shown with feedback associated with the ML models. In the example shown herein, each model has corresponding feedback ($166_A$), ($166_B$), and ($166_N$). Details of the feedback ($166_A$)-($166_N$) are shown and described below.

Association rule learning is a rule-based ML method for discovering relations between variables in databases. Given a set of transactions, associated rule learning predicts an occurrence of an item based on occurrences of other items in the transaction. Association rule learning is intended to identify strong rules discovered in databases using some measure of discovered relations between variables, such as frequency of occurrences in the data. An example of association rule learning is the Apriori algorithm. The Apriori algorithm uses a breadth-first search strategy to sweep through program code and a candidate generation functions to exploit a downward closure property of support. This algorithm is an example association rule learning algorithm that may be utilized by the ML model(s) shown and described below. The ML model(s), shown herein as ($164_A$), ($164_B$), and ($164_N$), effectively create a mapping between the application artifacts and the pipeline artifact(s). More specifically, the ML model(s) employ an algorithm to analyze an impact between the collected application artifacts reflected in the dependency graphs and the pipeline artifact(s). The mapping provides dependency information for how a detected change of one or more application artifacts will impact a micro-service in the pipeline. In one embodiment, the ML manager (154) analyzes the impact of the detected change and uses the analysis to predict a consequence of an application change in the pipeline. The analysis is described below in FIG. 3. In an embodiment, the mapping is referred to as an impact mapping to capture how a change to one or more select application artifacts would impact one or more pipeline artifacts, and effectively suggest or implement a change to the pipeline.

The AI platform (150) is shown herein with several tools to support optimization of the pipeline based on detection or identification of a change to one or more application artifacts, learning or learned dependencies of any impact of the change(s) on the pipeline artifacts, selective optimization of pipeline artifacts in the pipeline based on the impact, and execution of the selectively optimized pipeline. The AI platform (150) tools are shown herein as a graph manager (152), a machine learning (ML) manager (154), a monitor (156), and a feedback manager (158). The tools (152), (154), (156), and (158), are operatively coupled, directly or indirectly, together, and provide the functions, as described below.

The graph manager (152) generates the dependency graphs shown in the first library (162). Details of the application and pipeline artifacts collection and the dependency graph generation are shown and described in FIG. 3. The example graphs ($162_A$), ($162_B$), and ($162_N$) shown herein are based on two or more collected application artifacts and express one or more relationships between the collected application artifacts. Accordingly, the graph manager (152) generates on or more dependency graphs to express relationships present and identified in the collected application artifacts.

It is understood that an application change may result in or cause a re-deployment of one or more micro-services in a corresponding application. As shown, the monitor (156) is operatively coupled to both the graph manager (152) and the ML manager (154). The monitor (156) functions to detect changes in the application as reflected in a corresponding application artifact. The monitor (156) watches any changes in the application artifacts that trigger the re-deployment of the one or more micro-services. In response to detection of such a change, the monitor (156) interfaces with the ML manager (154) to identify a corresponding ML model ($164_A$)-($164_N$) from the second library (164), with the identified ML model corresponding to the detected change. The ML manager (154) leverages the identified ML model to identify the impact of the detected change on one or more pipeline artifacts, and selectively optimize the pipeline based on the impact. Since each ML model captures a relationship between a dependency graph and a pipeline artifact, the ML manager (154) identifies an appropriate model from the knowledge base (170), and model employs the algorithm, which in an embodiment is an association rule learning algorithm. In addition, the ML manager (154) encodes any mapped changes that correspond to the impact from the ML models ($164_A$)-($164_N$) into the pipeline. In an embodiment, the encoding is automatic to transparently create an optimized pipeline as a response to the identified impact. In an embodiment, the optimization of the pipeline is selective by limiting the encoding to only one or more pipeline artifacts of the pipeline that are impacted or otherwise affected by the application artifact change(s). The selective encoding of the pipeline supports an active learning methodology to further teach the ML model to recognize repeatable patterns in future processes. In an embodiment, instituting the active learning methodology enhances efficiency with respect to deployment of the pipeline as non-impacted pipeline artifacts are not unnecessarily assessed. The processing unit (112) executes the optimized pipeline with the selectively encoded pipeline or pipeline artifacts based on the identified impact to improve the efficiency of the pipeline and the deployment time. Accordingly, AI and ML are employed to automatically and selectively optimize the pipeline and pipeline artifacts.

As further shown, a feedback manager (158) is operatively coupled to the monitor (156). The feedback manager (158) collects feedback, shown herein as feedback $(166_A)$-$(166_N)$ stored in the knowledge base (170), corresponding to the detected impacts. In an embodiment, the collected feedback $(166_A)$-$(166_N)$ or feedback data, collectively referred to herein as feedback, is user generated feedback. As shown and described in FIG. 4, the collected feedback emanates from a subject matter expert (SME), and may include real-time data corresponding to the deployment or re-deployment of the impacted pipeline artifact. As shown herein, the feedback $(166_A)$-$(166_N)$ is operatively coupled to the ML model(s) $(164_A)$-$(164_N)$. More specifically, ML model $(164_A)$ is shown with feedback $(166_A)$, ML model $(164_B)$ is shown with feedback $(166_B)$, and ML model $(164_N)$ is shown with feedback $(166_N)$. It is understood that in an embodiment, one or more of the ML models $(164_A)$-$(164_N)$ may not have operatively coupled feedback. The feedback is utilized by the feedback manager (158) to further train or subject the corresponding ML models $(164_A)$-$(164_N)$ to training. Accordingly, the feedback manager (158) utilizes feedback associated with a corresponding ML model to further train the ML model for application in future detection of application artifact changes.

In some illustrative embodiments, server (110) may be the IBM Watson system available from International Business Machines Corporation of Armonk, N.Y., which is augmented with the mechanisms of the illustrative embodiments described hereafter. The graph manager (152), ML manager (154), monitor (156), and feedback manager (158), hereinafter referred to collectively as AI tools, are shown as being embodied in or integrated within the AI platform (150) of the server (110). In one embodiment, the AI tools may be implemented in a separate computing system (e.g., 190) that is connected across network (105) to the server (110). Wherever embodied, the AI tools function to support automatically encoding processing rules into the pipeline based on identified changes by learning dependencies.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store $(190_A)$, and mainframe computer (182) utilizes nonvolatile data store (182a). The nonvolatile data store $(182_A)$ can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
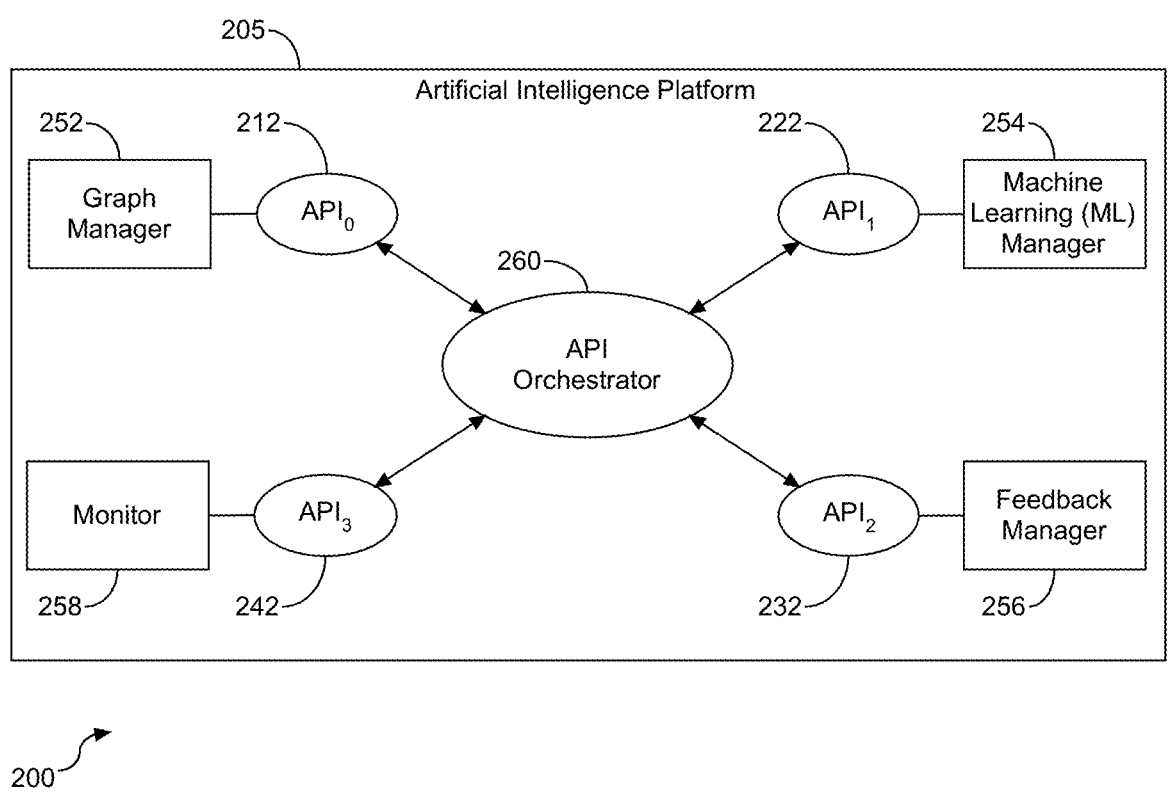
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the AI platform (150) shown and described in FIG. 1, one or more APIs may be utilized to support one or more of the tools (152), (154), (156), and (158) and their associated functionality. Referring to FIG. 2, a block diagram (200) is provided illustrating the tools (152), (154), (156), and (158) and their associated APIs. As shown, a plurality of tools are embedded within the artificial intelligence platform (205), with the tools including the graph manager (252) associated with APIO (212), the ML manager (254) associated with $API_1$ (222), the feedback manager (256) associated with $API_2$ (232), and the monitor (258) associated with $API_3$ (242). Each of the APIs may be implemented in one or more languages and interface specifications.

As shown, APIO (212) is configured to support and enable the functionality represented by the graph manager (252). $API_0$ (212) provides functional support to generate one or more dependency graphs based on two or more collected application artifacts; API (222) provides functional support to capture a relationship between the dependency graphs and one or more collected pipeline artifacts, identify an impact of a detected application change on one or more pipeline artifacts in the form of a mapping, and encode the mapped changes corresponding to the identified impact into the pipeline; $API_2$ (232) provides functional support to monitor the application for changes; and $API_3$ (242) provides functional support to utilize user feedback in an active learning methodology to further train the ML models for future processes. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
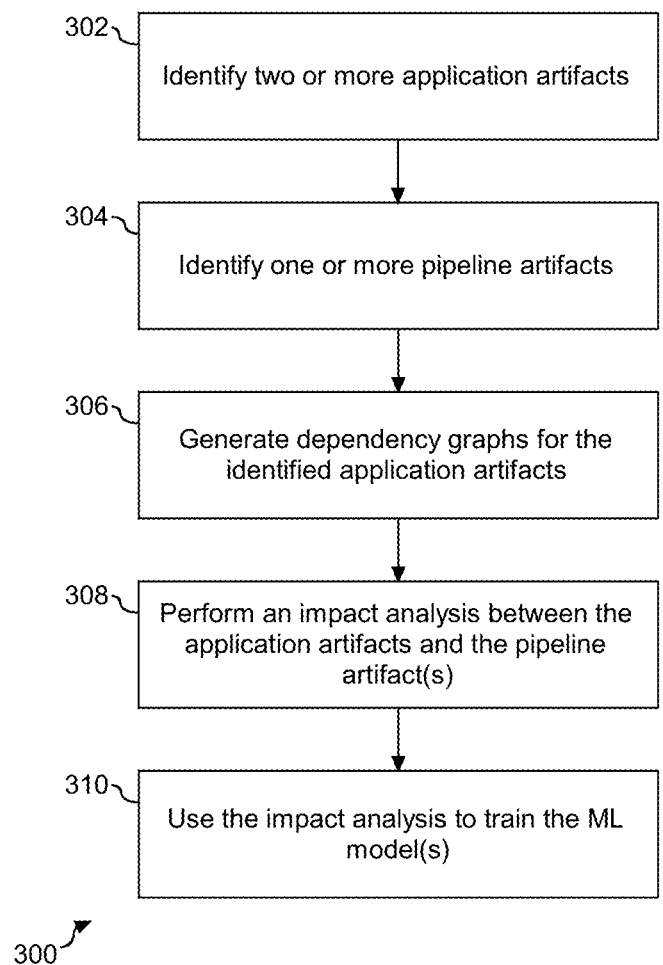
FIG. 3 depicts a flow chart illustrating a process for conducting an impact analysis to determine relationships between application artifacts and pipeline artifacts.

Referring to FIG. 3, a flow chart (300) is provided illustrating a process for conducting an impact analysis to determine the relationships between application artifacts and pipeline artifacts. As shown, two or more application artifacts are identified (302). Example of application artifacts include, but are not limited to, application source code, testing code, application programming interface (API) specifications, application configurations, deployment scripts, and variables. Following the application artifact identification, one or more pipeline artifact(s) are identified (304). Examples of pipeline artifacts include, but are not limited to, capabilities, processes, and components. Dependency graphs are generated for the identified application artifacts (306). Each dependency graph depicts relationships between portions of an application, and more specifically the graph articulates how each portion of an application change can have an impact on one or more other portions of the application or a related application. For example, a change detected to one of the applications could trigger one or more API tests of one or more related applications. Accordingly, the dependency graphs capture inter-dependent relationships of application artifacts.

Following the creation of the dependency graphs, an impact analysis is performed between the application artifacts as reflected in the dependency graphs and the one or more pipeline artifact(s) (308). In an embodiment, an association rule learning algorithm is leveraged to perform the impact analysis. It is understood in the art that application artifacts may interface with one or more pipeline artifacts. This interface may be a direct relationship or an indirect relationship between the application artifacts and the pipeline artifacts. The impact analysis captures both the direct and the indirect relationships. More specifically, the impact analysis represents both direct and indirect relationships of application artifacts corresponding to different pipeline artifact(s), where present. For example, the mapping can provide dependency information for how a detected change to the application will impact a micro-service associated with a pipeline artifact. The impact analysis indicating the relationships between the application artifacts and pipeline artifacts is used to train one or more associated ML model(s) (310). Accordingly, the steps shown herein represents collection of application artifacts and collection of pipeline artifacts, creating dependency graphs to capture direct and indirect relationships of application artifacts, and performing an impact analysis to determine the relationships between the application and pipeline artifacts to train one or more ML model(s).

Figure 4:
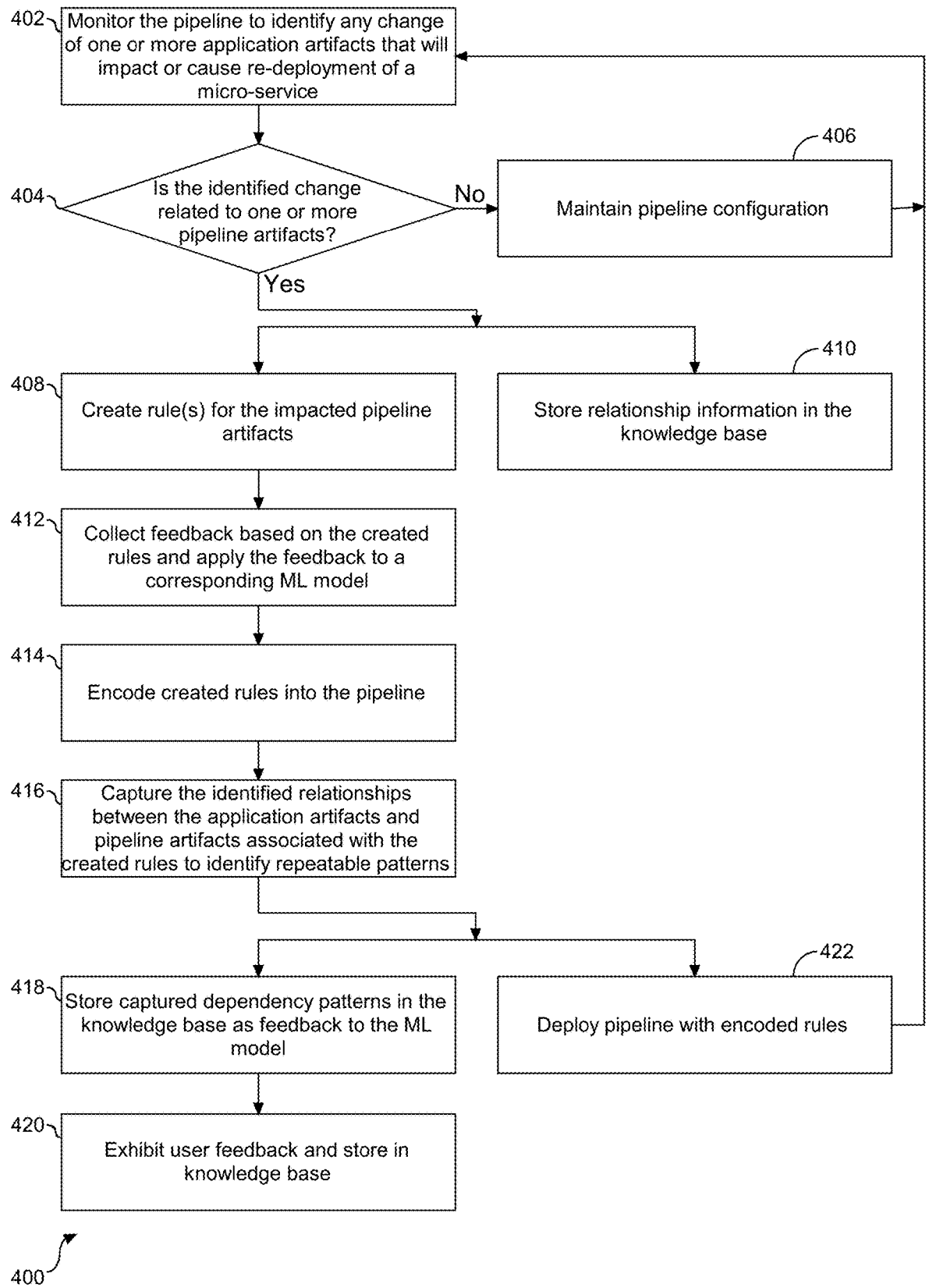
FIG. 4 depicts a flow chart illustrating a process for automatic and selective optimization of the CI/CD pipeline.

As shown and described in FIG. 1, a ML manager (154) functions to support and enable one or more ML model(s) (164$_A$)-(164$_N$) to support and enable optimization of the pipeline. Referring to FIG. 4, a flow chart (400) is provided illustrating a process for automatic and selective optimization of the pipeline. As shown, the pipeline is monitored to identify any change of one or more application artifacts that will impact or cause re-deployment of a micro-service (402). Utilizing the one or more ML model(s) created in FIG. 3, a determination is made to assess if the identified change is related to one or more pipeline artifact(s) (404). A negative response to the determination indicates that no pipeline artifact(s) are impacted by the identified change and the pipeline is maintained in its current configuration (406), followed by a return to step (402) for continued monitoring. A positive response to the determination at step (404) indicates that the identified change impacts one or more pipeline artifacts and rules are created for the impacted pipeline artifacts (408). More specifically, at step (408) rules directed to calling subroutines of each affected pipeline artifact are created. For example, the rule(s) may direct a deployment or re-deployment of a specific impacted pipeline artifact. As shown herein, in addition to creating one or more rules, corresponding relationship information from the positive determination made at step (404) is shown herein stored in the knowledge base (410). In an embodiment, the rule updating at step (408) and storing the relationship information at step (410) may occur in parallel. Accordingly, a change that triggers re-deployment of one or more micro-services is identified and an assessment is conducted to determine whether the identified change impacts the one or more pipeline artifact(s).

Following step (408), feedback based on the created rules is collected and applied to a corresponding ML model(s) (412). In an embodiment, the feedback collected at step (412) emanates from a subject matter expert (SME). Similarly, in an embodiment, the collected feedback may include real-time data corresponding to the deployment or re-deployment of the impacted pipeline artifact. In an embodiment, the application of feedback at step (412) is optional. The created rules are encoded into the pipeline (414). The identified relationships between the application artifacts and pipeline artifacts, also referred to as dependency patterns, associated with the created rules are captured to identify repeatable patterns in future processes (416) and the captured dependency patterns are stored in the knowledge base (418) as feedback to the ML model. In an embodiment, data processing may be used to identify software elements that are related to pipeline artifacts. An example of an identified pattern is the deployment or re-deployment of one or more micro-services corresponding to a monitored or detected change in an application artifact. Any user feedback (420) that has been collected and incorporated into the encoded rules is also shown herein stored in the knowledge base (418). Following the capturing of the dependency patterns in step (416), the pipeline with the encoded rules is deployed (422). The deployment of the pipeline with the encoded rules creates an optimized pipeline where only the pipeline artifacts impacted by the change identified at step (402) are encoded into the pipeline for re-deployment. The optimized pipeline creates an efficient process for re-deployment of the pipeline while maintaining a level of reliability. Following step (422), the process returns to step (402) for continued monitoring. Accordingly, the created rules are encoded into the pipeline creating an optimized pipeline for deployment.

Aspects of automatically and selectively optimizing pipeline artifacts based on identified changes by learning dependencies are shown and described with the tools and APIs shown in FIGS. 1 and 2, respectively, and the processes shown in FIGS. 3 and 4. Aspects of the functional tools (152), (154), (156), and (158) and their associated functionality may be embodied in a computer system/server in a single location, or in one embodiment, may be configured in a cloud-based system sharing computing resources. With references to FIG. 5, a block diagram (500) is provided illustrating an example of a computer system/server (502), hereinafter referred to as a host (502) in communication with a cloud-based support system, to implement the processes described above with respect to FIGS. 3 and 4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (510) where tasks are performed by remote processing devices that are linked through a communications network. In a distributed cloud computing environment, program modules may be located in both local and remote computer system storage media including memory storage devices.

Figure 5:
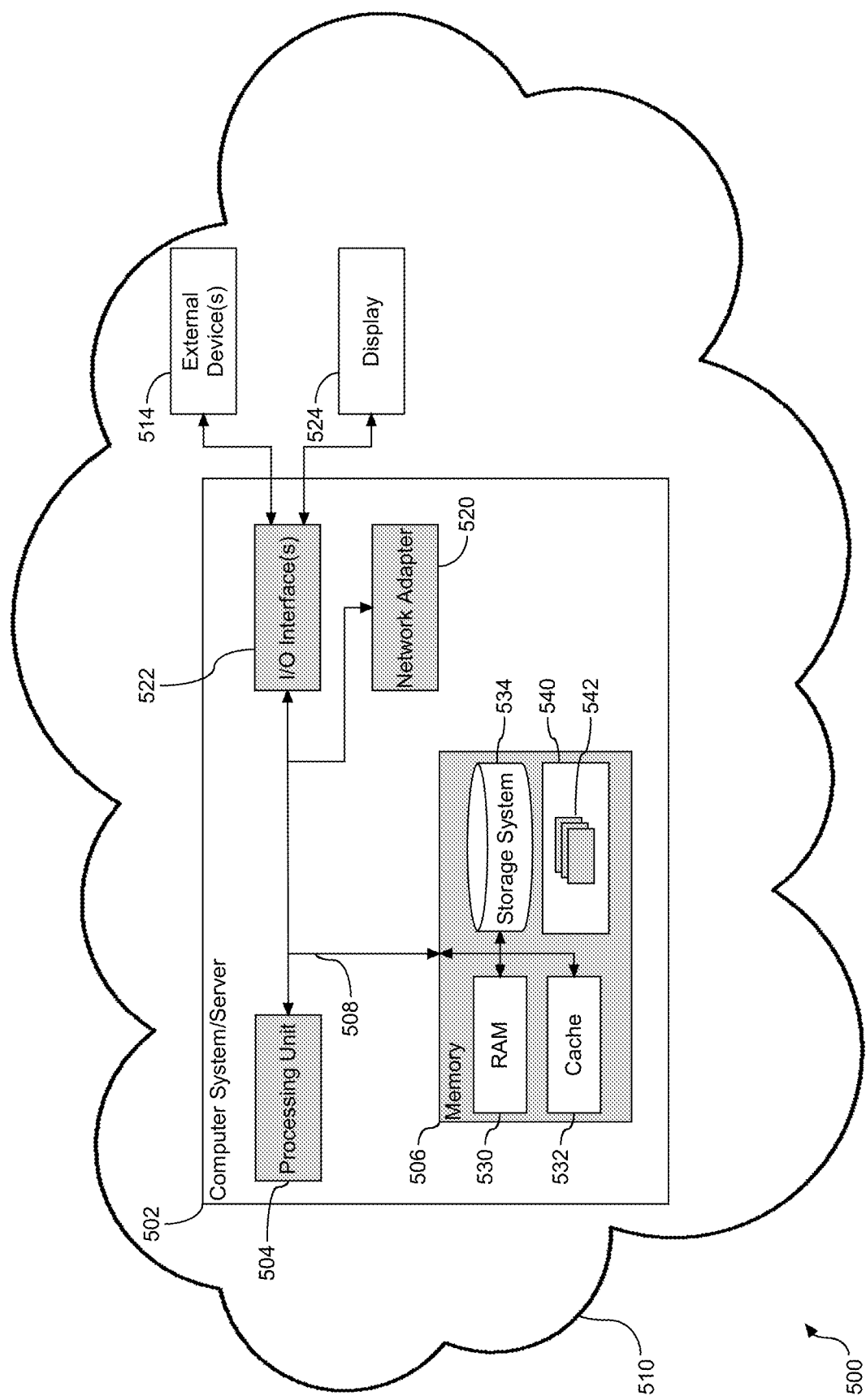
FIG. 5 depicts a block diagram illustrating an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processing unit (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to integrate automatically selecting DevOps pipeline artifacts based on identified changes by learning dependencies. For example, the set of program modules (542) may include the tools (152), (154), (156), and (158) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
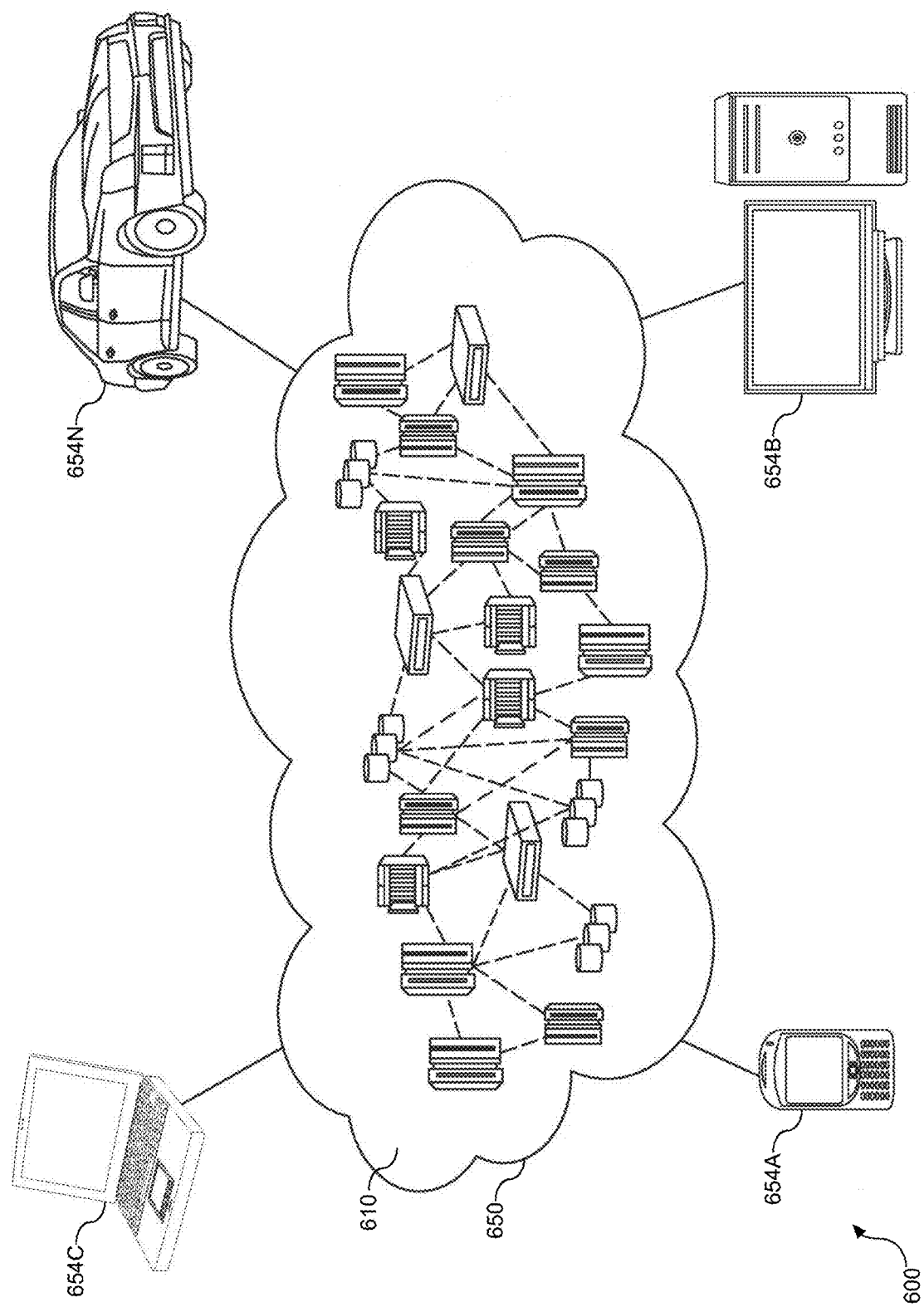
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
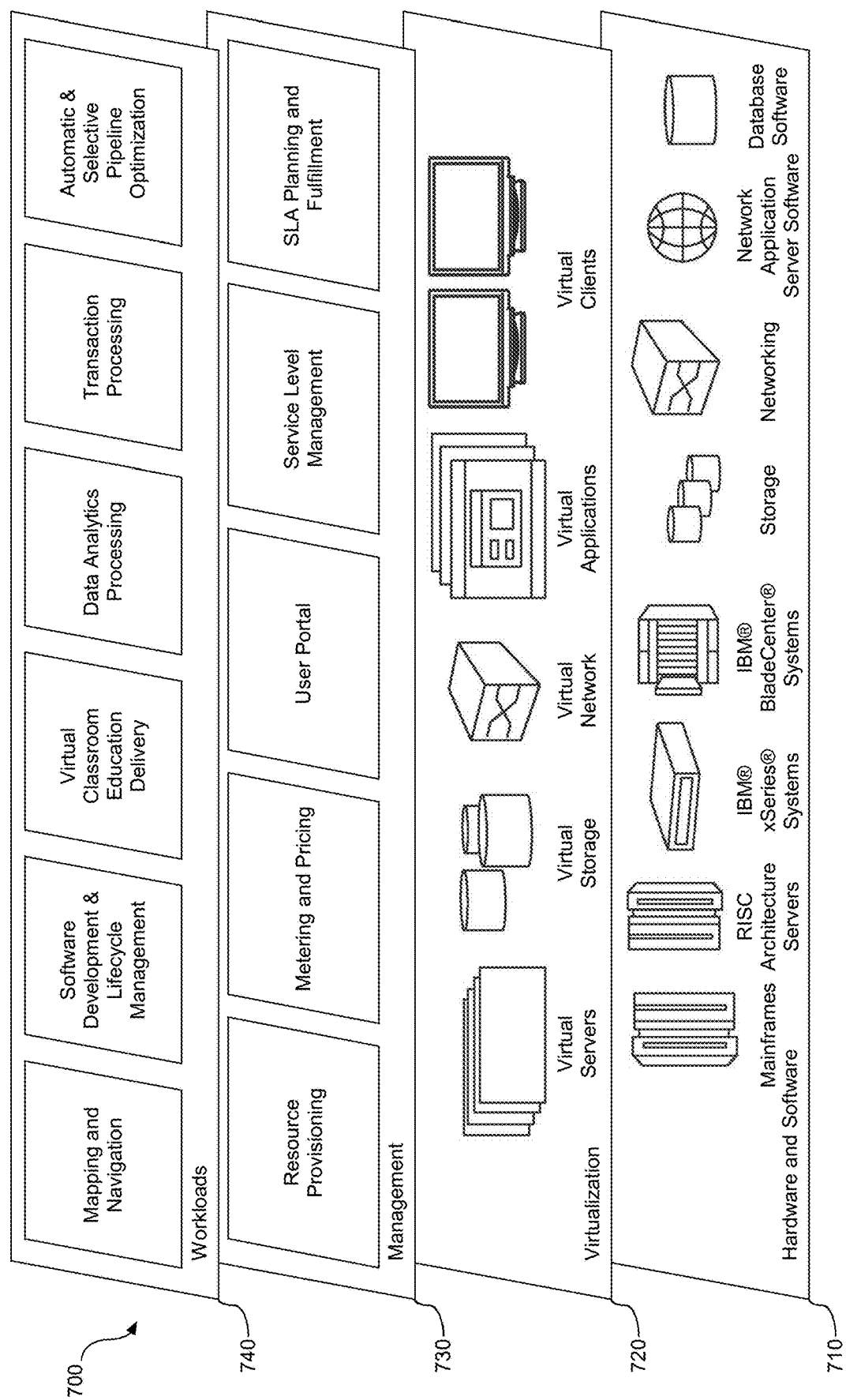
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and automatic and selective optimization of the pipeline.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an AI platform to automatically and selectively optimize DevOps pipeline artifacts based on identified changes by learning dependencies.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the knowledge base may be localized, remote, or spread across multiple systems. Accordingly, the scope of protection of the embodiments is limited only by the following claims and their equivalents.

What is claimed is:

1. A computer system comprising:
    a processing unit operatively coupled to memory;
    an artificial intelligence (AI) platform operatively coupled to the processing unit, the AI platform configured with one or more tools to support a continuous integration and continuous deployment (CI/CD) pipeline for software development and operations (DevOps), the one or more tools comprising:
        a graph manager to generate one or more dependency graphs based on two or more application artifacts;
        a machine learning (ML) manager operatively coupled to the graph manager, the ML manager to leverage a ML model to capture a relationship between one or more dependency graphs and one or more pipeline artifacts;
        a monitor to detect a change to the one or more of the application artifacts, and responsive to the detected change the ML manager to:
            leverage the captured relationship to identify an impact of the detected change on the one or more pipeline artifacts; and
            selectively optimize the pipeline in response to the identified impact, the optimization including automatically encoding mapped changes corresponding to the identified impact into the pipeline; and
        the processing unit to execute the optimized pipeline.

2. The computer system of claim 1, wherein the identification of impact of the detected change on one or more pipeline artifacts further comprises:
    the ML manager to create a measurement of the impact and use the measurement to predict a consequence of the application artifact change in the pipeline.

3. The computer system of claim 1, further comprising a feedback manager to capture any dependency patterns in the optimized pipeline.

4. The computer system of claim 3, further comprising the feedback manager to employ an active learning methodology to capture real-time data and real-time data feedback, and employ the captured data to train the ML Model.

5. The computer system of claim 1, wherein the application artifacts include source code, testing code, application programming interface (API) specifications, configurations, deployment scripts, or a combination thereof.

6. The computer system of claim 1, wherein the captured relationship between the one or more dependency graphs and one or more pipeline artifacts represents impact dependencies between the application artifacts and the one or more pipeline artifacts.

7. The computer system of claim 1, wherein each of the one or more pipeline artifacts has a corresponding dependency graph.

8. A computer program product to support a continuous integration and continuous deployment (CI/CD) pipeline for software development and operations (DevOps), the computer program product comprising a computer readable storage medium having program code embodied therewith, the program code executable by a processor to:
    generate one or more dependency graphs based on two or more application artifacts;
    employ a machine learning (ML) model to capture a relationship between the one or more dependency graphs and one or more pipeline artifacts;
    detect a change to the one or more application artifacts, and responsive to the detected change the ML model to:
        leverage the captured relationship to identify impact of the detected change on the one or more pipeline artifacts; and
        selectively optimize the pipeline responsive to the identified impact, the optimization including automatic encoding mapped changes corresponding to the identified impact into the pipeline; and
    execute the optimized pipeline.

9. The computer program product of claim 8, wherein the identification of impact of the detected change on the one or more pipeline artifacts further comprising program code to:
    create a measurement of the impact and use the measurement to predict a consequence of the application artifact change in the pipeline.

10. The computer program product of claim 8, further comprising program code to capture any dependency patterns in the optimized pipeline.

11. The computer program product of claim 10, further comprising program code to employ an active learning methodology to capture real-time data and real-time data feedback, and employ the captured data to train the ML Model.

12. The computer program product of claim 8, wherein the application artifacts include source code, testing code, application programming interface (API) specifications, configurations, deployment scripts, or a combination thereof.

13. The computer program product of claim 8, wherein the application artifacts include source code, testing code, application programming interface (API) specifications, configurations, deployment scripts, or a combination thereof.

14. The computer program product of claim 8, wherein the captured relationship between the one or more dependency graphs and one or more pipeline artifacts represents impact dependencies between the application artifacts and the one or more pipeline artifacts.

15. The computer program product of claim 8, wherein each of the one or more pipeline artifacts has a corresponding dependency graph.

16. A method comprising:
 generating one or more dependency graphs based on two or more application artifacts;
 employing a machine learning (ML) model to capture a relationship between dependency graphs and one or more pipeline artifacts;
 detecting a change to one or more of the application artifacts, and responsive to the detected change the ML model:
  leveraging the captured relationship to identify impact of the detected change on the one or more pipeline artifacts; and
  selectively optimizing a continuous integration and continuous deployment (CI/CD) pipeline responsive to the identified impact, the optimization including automatically encoding mapped changes corresponding to the identified impact into the pipeline; and
 executing the optimized pipeline.

17. The method of claim 16, wherein identifying impact of the detected change on the one or more pipeline artifacts further comprising: the ML model creating a measurement of the impact and using the measurement to predict a consequence of the application artifact change in the pipeline.

18. The method of claim 16, further comprising capturing any dependency patterns in the optimized pipeline and employing an active learning methodology to capture real-time data and real-time data feedback, and employing the captured data to train the ML Model.

19. The method of claim 16, wherein the application artifacts include source code, testing code, application programming interface (API) specifications, configurations, deployment scripts, or a combination thereof.

20. The method of claim 16, wherein the captured relationship between the one or more dependency graphs and one or more pipeline artifacts represents impact dependencies between the application artifacts and the one or more pipeline artifacts.

\* \* \* \* \*